April 22, 1958 M. O. BUNGE 2,831,261
DEVICE FOR CHECKING AND MEASURING CYLINDRICAL
BORES OF LARGE DIAMETER
Filed Aug. 24, 1956 2 Sheets-Sheet 1
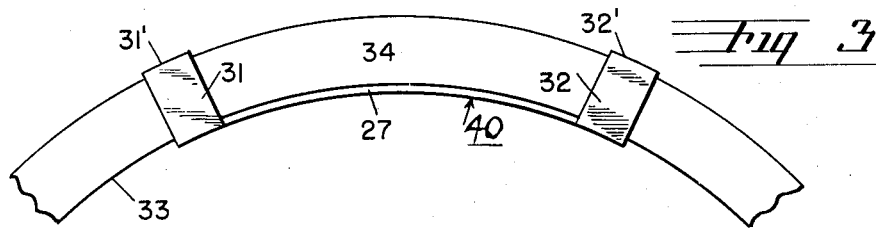
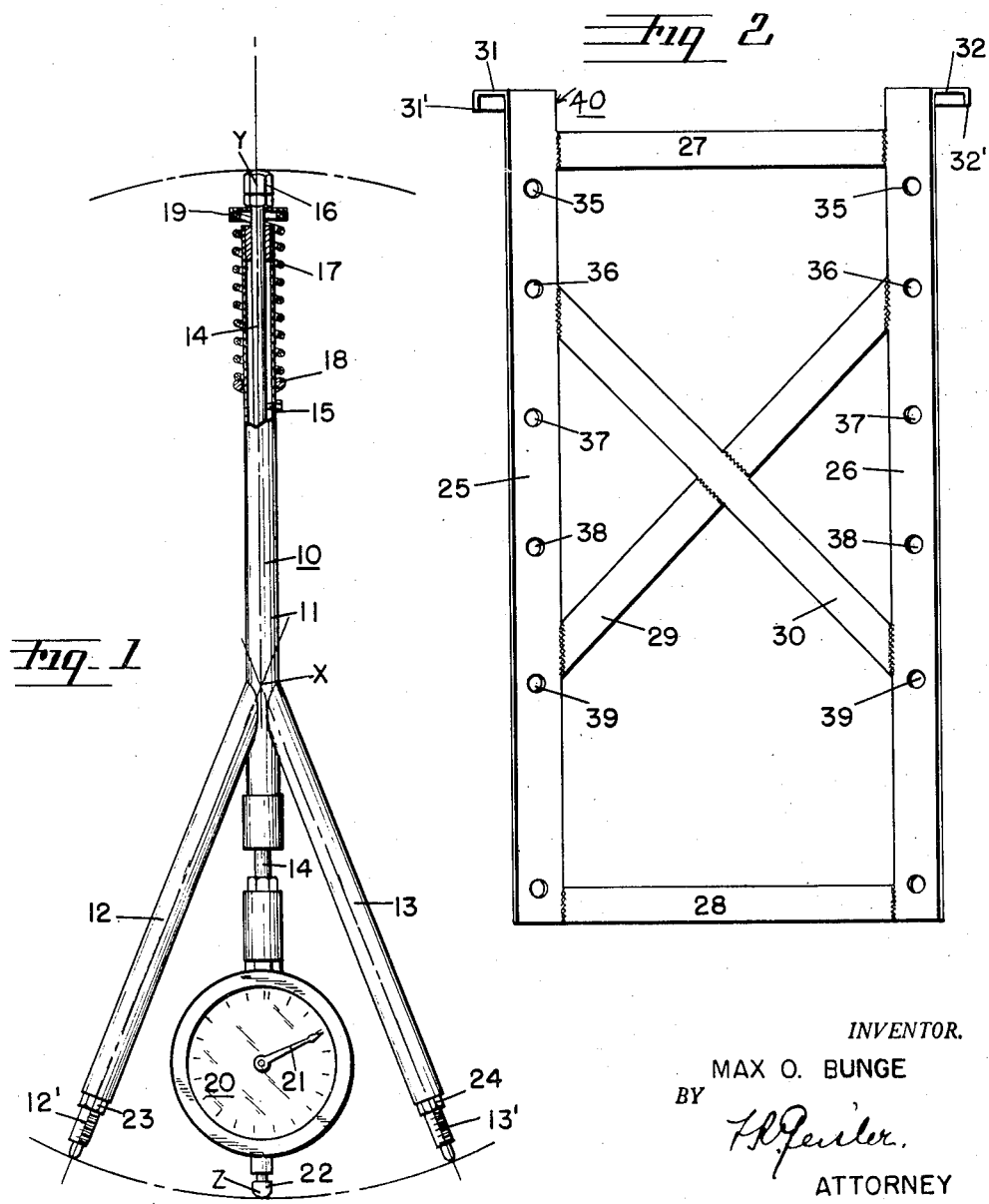
INVENTOR.
MAX O. BUNGE
BY
ATTORNEY April 22, 1958   M. O. BUNGE   2,831,261
DEVICE FOR CHECKING AND MEASURING CYLINDRICAL
BORES OF LARGE DIAMETER
Filed Aug. 24, 1956   2 Sheets-Sheet 2
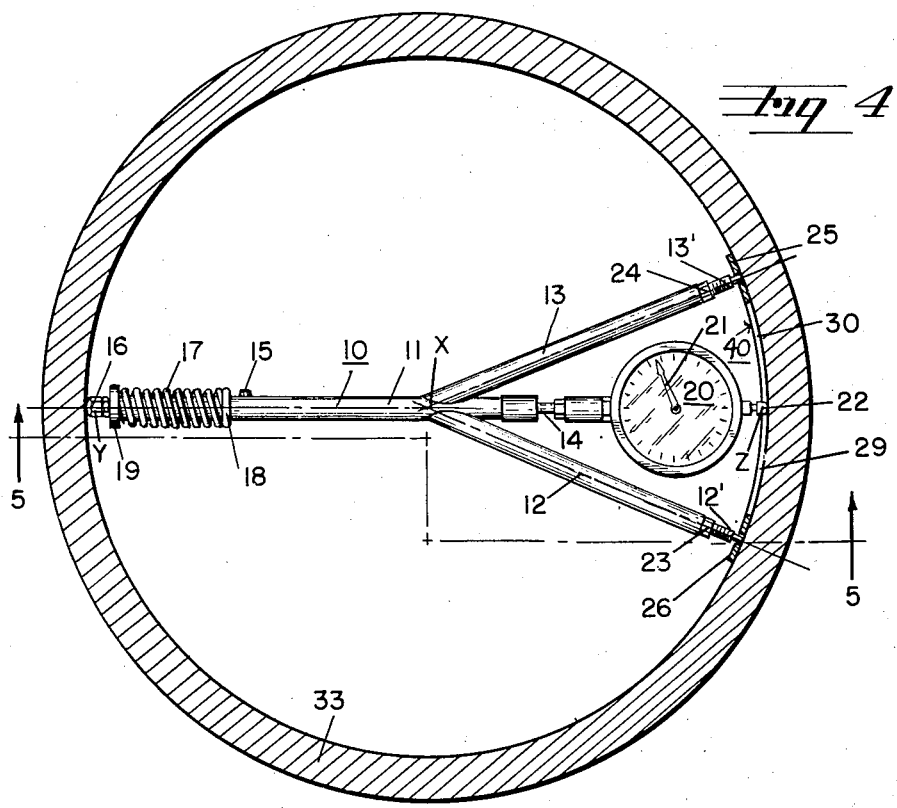
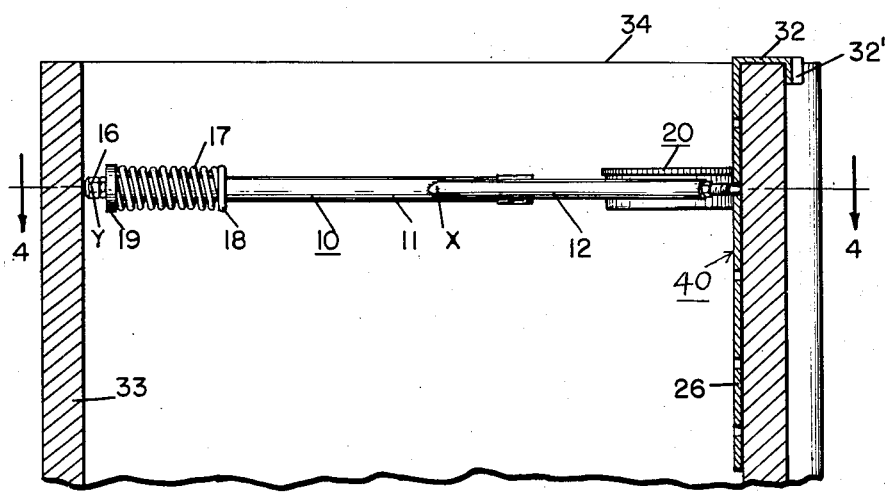
INVENTOR.
MAX O. BUNGE
BY
*F.R. Geisler*
ATTORNEY United States Patent Office 2,831,261
Patented Apr. 22, 1958

2,831,261

DEVICE FOR CHECKING AND MEASURING CYLINDRICAL BORES OF LARGE DIAMETER

Max O. Bunge, Mexico City, Mexico

Application August 24, 1956, Serial No. 605,986

6 Claims. (Cl. 33—178)

This invention relates to a special gauge or measuring device for use particularly in the testing and measuring of the bores of cylinders, and is intended especially for employment in measuring the wear taking place in large diameter cylinders for the purpose of recording performance and of determining when a cylinder liner should be changed.

While various means and devices have been developed for measuring and checking cylinder diameters, these for the most part have been designed for use with cylinders of medium or smaller diameters, and, if made in a size suitable for use in large diameter cylinders, would be cumbersome, difficult and inconvenient to use properly, and expensive to manufacture.

An object of the present invention is to provide an improved cylinder diameter or bore measuring device which is so constructed and arranged that it can readily be made in any desired size for cylinders of medium or large diameters, and, when made in proper sizes, can easily and conveniently be employed for measuring cylinder bores regardless how large their diameters may be.

A related object of the invention is to provide an improved device for measuring large cylinder bores which will be of simple construction and not expensive to manufacture.

A further object of the invention is to provide a cylinder bore measuring device which will not require any special skill in its employment nor more than ordinary care in its maintenance.

The manner in which these objects and other incidental advantages are attained by the device of the present invention will become apparent from the following brief description wherein reference is made to the accompanying drawings.

In the drawings:

Figure 1 is a plan view of the main or measuring portion of the device;

Figure 2 is an elevation of the other portion of the device which serves as a positioning guide frame for the main or measuring portion;

Figure 3 is a top plan view illustrating the positioning guide frame of Figure 2 placed within a cylinder, the diameter of which is to be checked;

Figure 4 is a section taken on the line indicated by the lines 4—4 in Figure 5 and illustrating the entire device placed in the bore of a cylinder in the process of the checking of the diameter of the cylinder; and Figure 5 is a corresponding sectional elevation on line 5—5 of Figure 4.

Referring first to Figure 1, the measuring apparatus illustrated includes a rigidly constructed, tubular, gauge-carrying frame assembly 10, resembling somewhat an A-frame in design, having a central tubular member 11, to which are secured a pair of leg members 12 and 13. These leg members are identical, they extend with their axes in a common plane containing also the axis of the central member 11, and extend at the same angularity with the member 11. Preferably the leg members 12 and 13 each extend at an angle of 22½° with the central member 11 making the included angle between the leg members exactly 45°.

A rod 14 is slidably but non-rotatably mounted in the central member 11. Any suitable means is provided for preventing turning of the rod with respect to the member 11 while permitting longitudinal movement of the rod, such, for example, as a key 15 set in the member 11 and engaging a longitudinal slot in the rod 14. The rod 14 is longer than its supporting member 11 and extends beyond member 11 at each end. The end of the rod 14 opposite from the leg members 12 and 13 is threaded and carries an adjustable nut 16, which, when the device is used, is adapted to contact the wall of the cylinder, the diameter of which is being checked.

A coil spring 17 is mounted on the member 11. One end of the spring 17 bears against a fixed collar 18 secured on the member 11 while the other end of this spring bears against a retainer ring 19 which in turn is held in place by the adjustable nut 16.

A gauge, indicated in general by the reference character 20, is rigidly secured on the opposite end of the rod 14. This gauge includes the usual movable hand 21 which moves around a dial scale 21', and the gauge includes usual means (not shown) for adjusting the relative position of the dial scale. The gauge is also provided with the customary spring loaded contact member or plunger 22 which operates the indicating hand 21. The plunger 22 is in alignment with the rod 14.

The two leg members 12 and 13 are threaded internally at their outer ends and carry identical adjustable threaded extension or contact members 12' and 13', respectively, which have tapered or pointed outer ends and which are secured in adjusted position by the nuts 23 and 24, respectively.

The other portion of the device, which is shown in Figures 2 and 3, the purpose of which is to act as the positioning guide for the measuring portion previously described, consists of a rigid frame 40, designed to be set on the inside of the cylinder or bore, the diameter of which is to be tested. This frame 40 consists of a pair of parallel identical main side members 25 and 26, preferably comprising flat metal bars, joined at top and bottom by the connecting bars 27 and 28 and also preferably connected by suitable cross members such as 29 and 30 in order to add rigidity to the frame. The frame is formed with a transverse curvature corresponding to the curvature of the wall of the cylinder in which the frame is set and the top ends of the side members 25 and 26 are bent outwardly at right angles, as shown at 31 and 32 in Figure 3, and then terminate in downwardly extending end flanges 31' and 32' so as to extend over the top or end 34 of the cylinder 33 which is being checked and thus hold the frame in position in the cylinder at the location at which it is placed.

Each of the main side members 25 and 26 of this curved frame is provided with identical holes drilled along the center line, which holes are at the same distances from the top ends of the respective members. These corresponding pairs of holes are indicated at 35—35, 36—36, 37—37, 38—38 and 39—39 in Figure 2. The number of pairs of these holes and the distances of the pairs from the top of the frame, and thus from the top or end of the cylinder to be measured, are optional. It is essential, however, to have the holes of each pair exactly the same distance from the top of the frame, as will be presently understood. The holes are slightly larger than the tapered or pointed ends of the adjustable extensions 12' and 13' on the leg members 12 and 13 (Figure 1) so as to allow these ends to extend through the holes and contact the wall of the cylinder or bore, and the arcuate distance between the centers of the holes in each pair is exactly equal to the arcuate distance between the tips of the extensions 12' and 13' on a circle of the same radius. In using the measuring device, the positioning frame 40 is set in place in the cylinder and the ends of the extensions 12' and 13' on the leg members 12 and 13 of the measuring frame or A-frame 10 are inserted in one of the pairs of holes in the members 25 and 26, thus enabling the ends of the extensions 12' and 13' to bear against the cylinder wall.

In Figure 1, the point at which the center lines of the leg members 12 and 13 intersect the center line of the central member 11 is indicated X. Preferably, although not necessarily, the extensions 12' and 13' are adjusted until the distance from the point X to each of the tips of these extensions 12' and 13' will be equal to the known radius of the cylinder to be tested. In any event, however, the distances between the point X to the tips of the extensions 12' and 13' must always be exactly the same. Since the leg members 12 and 13 form exactly equal angles with the central member 11 and lie in the same plane as the central member 11, the bringing of this plane into perpendicularity with the cylinder axis, will result in the member 11, and with it the rod 14 and the aligned gauge plunger 22, coinciding with a diameter of the cylinder in that plane.

In preparing the device for use in a particular cylinder, the overall length of the rod 14, and nut 16, gauge 20 and plunger 22 (thus the distances between points Y and Z in Figure 1), is set, with the gauge under compression, either by employing an outside micrometer or by using some other fixed standard set exactly to the proper diameter for the cylinder. While the rod 14 and gauge of the device are held in this compressed position, the dial of the gauge is adjusted to bring the zero point of the dial scale into registration with the indicating hand 21. This preparatory adjustment and setting can also be done by placing both portions of the device (thus the frames 40 and 10) in a new cylinder of known diameter with the extensions 12' and 13' inserted through a pair of the holes in the frame 40 and moving the end of the frame 10, to which the nut 16 is located, up and down until a minimum gauge reading is obtained (which will occur when the rod 14 coincides exactly with the cylinder diameter), and then adjusting the indicator scale.

When the preparatory adjustment of the measuring portion of the device is accomplished in either of these ways, the device is then ready for measuring or checking the diameter a various points in the cylinder bore to be tested without any further adjustment or change of setting. This is now accomplished easily by placing the positioning frame 40 in the bore, inserting the extension members 12' and 13' in a pair of holes in the positioning frame, and moving the free end of the frame 10 sufficiently to ascertain the minimum gauge reading. This operation is then repeated for testing the diameter similarly, at any points desired, by relocating the device accordingly.

Minor variations in the construction of either of the frames or portions 10 or 40 of the device would be possible without departing from the principle of the invention or changing the manner in which the two portions are adapted for functioning. The device would, of course, have to be made in different size for use with cylinders of any appreciable differences in diameters, but the diameter testing would always be accomplished in the same simple and easy manner, and also, in contrast to other known diameter measuring and checking gauges, the device of the present invention is particularly suited for practical use in the measuring of cylindrical bores of large diameter.

I claim:

1. In a cylinder bore measuring device of the character described, the combination of a gauge-carrying frame having a main tubular member, a pair of identical branch members extending from the same point on opposite sides of said main tubular member with their axes in a common plane containing also the axis of said main tubular member, and arranged at the same angularity with said tubular member, a rod slidably mounted in said main tubular member and extending beyond each end thereof, a gauge secured on one end of said rod, said gauge having a movable indicator and a spring-loaded contact plunger operating said indicator, said contact plunger being in alignment with said rod, the distance from the opposite end of said rod to the end of said contact plunger for said gauge being greater than the diameter of the cylinder bore to be measured except when said contact plunger is pressed inwardly against the force of its spring, and means mountable in a cylinder bore, for holding the ends of said branch members in desired position on the wall of the bore at points lying in a plane perpendicular to the bore axis while said main tubular member, and therewith said rod, and gauge plunger, are brought into said plane and thereby into coincidence with a diameter of the bore.

2. In a cylinder bore measuring device of the character described, the combination of a gauge-carrying frame having a central tubular member, a pair of identical leg members extending from the same point on opposite sides of said central tubular member with their axes in a common plane containing also the axis of said central tubular member and arranged at the same angularity with said tubular member, said leg members terminating in identical contact elements, a rod slidably but non-rotatably mounted in said central tubular member and extending beyond each end thereof, a gauge secured on the end of said rod between said leg members, said gauge having a movable indicator and a spring-loaded contact plunger operating said indicator, said contact plunger being in alignment with said rod, a contact element on the opposite end of said rod, spring means urging said latter mentioned contact element and therewith said opposite end of said rod outwardly from the adjacent end of said central tubular element, the distance from said latter mentioned contact element to the end of said contact plunger for said gauge being greater than the diameter of the cylinder bore to be measured except when said contact plunger is pressed inwardly against the force of its spring, and means, mountable in a cylinder bore, for holding said contact elements on the ends of said leg members in desired position on the wall of the bore at points lying in a plane perpendicular to the bore axis while said central tubular member, and therewith said rod, and gauge plunger, are brought into said plane and thereby into coincidence with a diameter of the bore.

3. In a cylinder bore measuring device of the character described, the combination of a gauge-carrying frame having a main central tubular member, a pair of identical branch leg members extending from the same point on opposite sides of said main central tubular member with their axes in a common plane containing also the axis of said main central tubular member, arranged at the same angularity of 22½° with said main central tubular member and thus making the included angle between said branch leg members 45°, identical adjustable contact elements on the ends of said branch leg members, a rod slidably but non-rotatably mounted in said main central tubular member and extending beyond each end thereof, a gauge secured on one end of said rod, said gauge having a movable indicator and a spring-loaded contact plunger operating said indicator, said contact plunger being in alignment with said rod, an adjustable contact nut on the opposite end of said rod, the distance from said contact nut to the end of said contact plunger for said gauge being greater than the diameter of the cylinder bore to be measured except when said contact plunger is pressed inwardly against the force of its spring, and a guide frame, mountable in a cylinder bore, for holding said contact elements on the ends of said branch leg members in desired position on the wall of the bore at points lying in a plane perpendicular to the bore axis while said main central tubular member, and therewith said rod, and gauge plunger, are brought into said plane and thereby into coincidence with a diameter of the bore.

4. The combination set forth in claim 1 with said means for holding the ends of said branch members in desired position constituting a guide frame having two spaced parallel main side bars, means on said guide frame for holding said guide frame in the cylinder bore with said side bars parallel to the cylinder bore axis, said side bars provided with pairs of apertures for holding the ends of said branch members in desired position on the wall of the cylinder bore, the apertures in each pair being located the same distance down from the top of said side bars respectively, and the spacing of the apertures in each pair corresponding to the distance between the ends of said branch members.

5. A cylinder bore measuring device including a gauge-carrying frame having a main tubular member, a pair of identical branch members extending from the same point on opposite sides of said main tubular member with their axes in a common plane containing also the axis of said main tubular member and arranged at the same angularity with said main tubular member, said branch members terminating in identical contact points, a rod slidably but non-rotatably mounted in said main tubular member and extending beyond each end thereof, a gauge secured on the end of said rod between said branch members, said gauge having a movable indicator and a spring-loaded contact plunger operating said indicator, said contact plunger being in alignment with said rod, an adjustable contact element on the opposite end of said rod, spring means urging said latter mentioned contact element and therewith said opposite end of said rod outwardly from the adjacent end of said main tubular element, the distance from said contact element to the end of said contact plunger for said gauge being greater than the diameter of the cylinder bore to be measured except when said contact plunger is pressed inwardly against the force of its spring, and a guide frame, mountable in a cylinder bore, for holding the ends of said branch members in desired position on the wall of the bore at points lying in a plane perpendicular to the bore axis while said main tubular member, and therewith said rod, and gauge plunger, are brought into said plane and thereby into coincidence with a diameter of the bore, said guide frame having two spaced parallel main side bars, said side bars provided with apertures for holding the ends of said branch members in desired position on the wall of the cylinder bore, the spacing between corresponding apertures in said side bars corresponding to the distance between the ends of said branch members, and means on said guide frame for holding said guide frame in the cylinder bore with said side bars parallel to the cylinder bore axis.

6. A cylinder bore measuring device comprising a gauge-carrying frame having a main central tubular member, a pair of identical leg members extending from the same point on opposite sides of said main central tubular member with their axes in a common plane containing also the axis of said tubular member and arranged at the same angularity of 22½° with said main central tubular member and thus making the included angle between said leg members 45°, identical adjustable contact elements on the ends of said leg members, a rod slidably but non-rotatably mounted in said main central tubular member and extending beyond each end thereof, a gauge secured on one end of said rod, said gauge having a movable indicator and a spring-loaded contact plunger operating said indicator, said contact plunger being in alignment with said rod, a contact element on the opposite end of said rod, spring means urging said latter mentioned contact element and therewith said opposite end of said rod outwardly from the adjacent end of said main central tubular member, the distance from said latter mentioned contact element to the end of said contact plunger for said gauge being greater than the diameter of the cylinder bore to be measured except when said contact plunger is pressed inwardly against the force of its spring, and a guide frame, mountable in a cylinder bore, for holding said contact elements on the ends of said leg members in desired position on the wall of the bore at points lying in a plane perpendicular to the bore axis while said main central tubular member, and therewith said rod, and gauge plunger, are brought into said plane and thereby into coincidence with a diameter of the bore, said guide frame formed with a transverse curvature approximately corresponding to that of the cylinder bore and having two spaced parallel main side bars said side bars provided with apertures for holding the ends of said leg members in desired position on the wall of the cylinder bore, the spacing between corresponding apertures in said side bars corresponding to the distance between the ends of said leg members of said gauge-carrying frame, and means on said guide frame for holding said guide frame in the cylinder bore with said side bars parallel to the cylinder bore axis.

References Cited in the file of this patent
UNITED STATES PATENTS
2,693,036     Garrett _____ Nov. 2, 1954